(12) United States Patent
McKinney

(10) Patent No.: US 9,533,569 B2
(45) Date of Patent: Jan. 3, 2017

(54) TAILGATE WITH STRUCTURALLY INTEGRATED CNG SYSTEM

(71) Applicant: The Heil Co., Chattanooga, TN (US)

(72) Inventor: Bobby Ray McKinney, Fort Payne, AL (US)

(73) Assignee: The Heil Co., Chattanooga, TN (US)

( * ) Notice: Subject to any disclaimer, the term of this patent is extended or adjusted under 35 U.S.C. 154(b) by 162 days.

(21) Appl. No.: 14/107,789

(22) Filed: Dec. 16, 2013

(65) Prior Publication Data

US 2014/0367954 A1 Dec. 18, 2014

Related U.S. Application Data

(60) Provisional application No. 61/836,378, filed on Jun. 18, 2013.

(51) Int. Cl.
*B60P 3/22* (2006.01)
*B60K 15/07* (2006.01)
*B62D 33/023* (2006.01)
*B60J 5/10* (2006.01)
*B65F 3/00* (2006.01)
*B60K 15/063* (2006.01)

(52) U.S. Cl.
CPC ............... *B60K 15/07* (2013.01); *B60J 5/108* (2013.01); *B62D 33/023* (2013.01); *B65F 3/00* (2013.01); *B60K 2015/0638* (2013.01); *B60Y 2200/144* (2013.01)

(58) Field of Classification Search
CPC .............. B60K 15/067; B60K 15/00; B60K 2015/03118; B60K 2015/03164; 2015/03184; B60K 15/063; B60K 2015/0636; B60K 2015/0638; B60K 2015/0639

USPC ......................................................... 280/834
See application file for complete search history.

(56) References Cited

U.S. PATENT DOCUMENTS

| | | | |
|---|---|---|---|
| 2,574,177 A | 11/1951 | Godet | |
| 2,895,560 A | 7/1959 | Lynn | |
| 3,134,603 A * | 5/1964 | Rogers | 280/834 |
| 3,565,201 A | 2/1971 | Petsinger | |
| 5,330,031 A | 7/1994 | Hill et al. | |
| 5,527,098 A * | 6/1996 | McKinney et al. | 298/23 MD |
| 5,549,096 A | 8/1996 | Swenson et al. | |
| 5,658,117 A * | 8/1997 | McKinney et al. | 414/408 |
| 5,787,920 A * | 8/1998 | Krasnov | B60K 15/03006 137/255 |
| 6,095,367 A | 8/2000 | Blair et al. | |
| 6,213,243 B1 | 4/2001 | Studebaker et al. | |
| 6,257,360 B1 | 7/2001 | Wozniak et al. | |

(Continued)

FOREIGN PATENT DOCUMENTS

JP 2008-137643 6/2008

OTHER PUBLICATIONS

Undated photographs taken by Fab Industries (now Agility) of a Labrie Refuse Vehicle With an Auxiliary CNG Holder added to the tailgate (12 pages).

*Primary Examiner* — Joseph Rocca
*Assistant Examiner* — Conan Duda
(74) *Attorney, Agent, or Firm* — Harness, Dickey & Pierce, P.L.C.

(57) ABSTRACT

A refuse vehicle has a tailgate. The tailgate has a framework to secure CNG tanks. A cover overlays the frame work to provide an aesthetic appearance to the vehicle.

17 Claims, 11 Drawing Sheets

(56) References Cited

U.S. PATENT DOCUMENTS

| | | |
|---|---|---|
| 6,279,612 B1 | 8/2001 | Warth |
| 6,367,573 B1 | 4/2002 | Scott |
| 6,412,588 B1 | 7/2002 | Scott et al. |
| 6,418,962 B1 | 7/2002 | Wozniak et al. |
| 6,439,334 B1 | 8/2002 | Myers et al. |
| 6,481,751 B1 | 11/2002 | Davis, Jr. et al. |
| 6,502,660 B1 | 1/2003 | Scott et al. |
| 6,527,075 B1 | 3/2003 | Izuchukwu et al. |
| 6,595,569 B1 * | 7/2003 | McKinney ..................... 296/51 |
| 7,137,474 B2 | 11/2006 | Yokote |
| 7,159,738 B2 | 1/2007 | Luongo |
| 7,270,209 B2 | 9/2007 | Suess |
| 7,543,667 B2 | 6/2009 | Hwang et al. |
| 7,624,753 B2 | 12/2009 | Suess et al. |
| RE41,142 E | 2/2010 | Blair et al. |
| 7,882,587 B2 | 2/2011 | Tagliaferri |
| 7,976,067 B2 * | 7/2011 | Naganuma ......... B60H 1/00371 180/69.2 |
| 8,690,191 B2 | 4/2014 | Gentry |
| 2001/0032747 A1 | 10/2001 | DePoy et al. |
| 2004/0091345 A1 * | 5/2004 | Flerchinger et al. ...... 414/525.2 |
| 2008/0098562 A1 * | 5/2008 | Tagliaferri ........... B60K 15/063 15/340.1 |
| 2008/0156809 A1 | 7/2008 | Mizuno et al. |
| 2010/0047047 A1 | 2/2010 | Mayer et al. |
| 2010/0078244 A1 | 4/2010 | Pursifull |
| 2010/0252353 A1 * | 10/2010 | Tsubokawa ........... B60K 15/07 180/314 |
| 2011/0288738 A1 * | 11/2011 | Donnelly ............ F02D 19/0697 701/99 |
| 2012/0228307 A1 * | 9/2012 | Simmons ............... B60K 15/07 220/562 |
| 2012/0280481 A1 | 11/2012 | Gentry |
| 2013/0199863 A1 * | 8/2013 | Robbins ...................... 180/69.4 |
| 2014/0061266 A1 * | 3/2014 | Milton ...................... F17C 5/06 224/404 |
| 2014/0367954 A1 * | 12/2014 | McKinney ................ B65F 3/00 280/834 |
| 2015/0129338 A1 * | 5/2015 | Green .................... B60K 15/07 180/69.4 |
| 2016/0023548 A1 * | 1/2016 | Crist ................ B60K 15/03006 180/271 |

* cited by examiner

US 9,533,569 B2

TAILGATE WITH STRUCTURALLY INTEGRATED CNG SYSTEM

CROSS-REFERENCE TO RELATED APPLICATION

This application claims the benefit of U.S. Provisional Application No. 61/836,378, filed on Jun. 18, 2013. The entire disclosure of the above application is incorporated herein by reference.

FIELD

The present disclosure relates to refuse vehicles and, more particularly, to a refuse vehicle with a tailgate including a CNG system.

BACKGROUND

Various types of refuse vehicles with CNG systems have been proposed in the past. One type is a CNG system mounted to the chassis frame. This system requires a large amount of space which usually is not available on various types of refuse vehicles. The size of the system limits the capacity of the refuse vehicle. Also, a large percentage of weight is added to the chassis front axle.

Another type of a CNG system is a roof mounted system. Here, the CNG system is mounted at the highest point on the unit. Accordingly, this exposes the CNG unit to damage by low bridge overpasses, shop doors, tree limbs, etc. Additionally, a roof mounted CNG system adds a large percentage of weight to the front axle.

Tailgate mounted preassembled PODs have been installed onto refuse vehicles. These units are relatively large providing an overhang with the center of gravity measured from the tailgate hinge. This creates a large moment on the tailgate raised cylinder and the tailgate structure. Additionally, the CNG fuel line routing is exposed due to the routing over the tailgate top cross member. The aesthetics of the preassembled system is not most desirable. Additionally, the tanks in the POD tailgate are stacked, making inspection and service of the tanks difficult. Additionally, the POD assembly is quite heavy adding additional weight to the refuse vehicle reducing its capacity.

It would be desirable to provide a refuse vehicle that overcame the deficiencies of the existing art. The present refuse vehicle provides a CNG system in the tailgate. The CNG system provides a larger fuel capacity than previous designs. The system does not extend above the vehicle and thus it is no taller than the highest point of the vehicle body. This eliminates damage caused from excessive height. The center of gravity measured from the center of the tailgate hinges is reduced due to the integrated design with a first CNG tank tucked between the tailgate hinges and the other tanks following the contour of the curved tailgate. The present design provides an aesthetic appearance with a contoured tailgate having a smooth appearance. The present disclosure enables inspection and service with a single integrated layer of tanks following the contour of the tailgate. Additionally, the weight is kept to a minimum by integrating and utilizing existing structure of the tailgate to create mounting space for the tanks.

SUMMARY

According to a first aspect of the disclosure, a tailgate for a refuse vehicle comprises a frame with a first leg and a second leg. The second leg angles with respect to the first leg. A plurality of CNG tanks is coupled with the frame. A cover overlays the frame and provides an aesthetic appearance to the tailgate. The first leg has an overall arcuate portion. At least one of the plurality of CNG tanks is positioned between a pair of hinges that connect the tailgate to the refuse vehicle. At least one of the plurality of CNG tanks is positioned in the second leg of the frame.

According to a second aspect of the disclosure, a refuse vehicle comprises a vehicle chassis with a container secured with the vehicle chassis. A tailgate is coupled with the container. The tail gate further comprises a frame with a first leg and a second leg. The second leg angles with respect to the first leg. A plurality of CNG tanks is coupled with the frame. A cover overlays the frame and provides an aesthetic appearance to the tailgate. The first leg has an overall arcuate portion. At least one of the plurality of CNG tanks is positioned between a pair of hinges that connect the tailgate to the refuse vehicle. At least one of the plurality of CNG tanks is positioned in the second leg of the frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10b is a side elevation view of FIG. 10a.

FIG. 11b is a side elevation view FIG. 11a.

DETAILED DESCRIPTION

Figure 1:
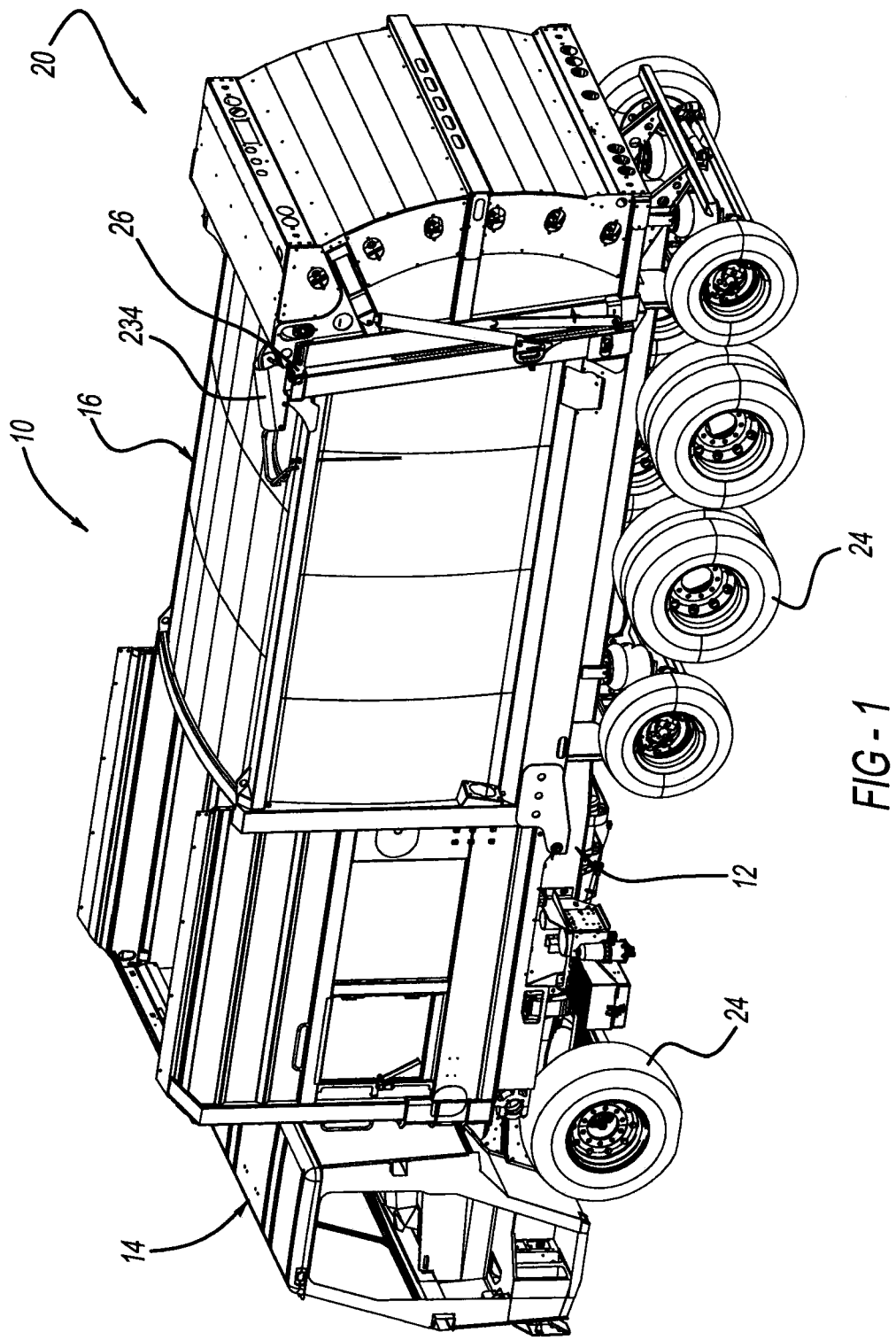
FIG. 1 is a perspective view of a refuse vehicle with a tailgate design of the disclosure.

Example embodiments will now be described more fully with reference to the accompanying drawings.

Turning to the figures, a refuse vehicle is illustrated and designated with the reference numeral 10. The refuse vehicle includes a chassis 12 with a cab 14, a refuse container 16 and tailgate 20. The chassis 12 includes a frame 22 that receives the refuse container 16 as well as wheels 24 that provide for mobility of the vehicle.

Figure 2:
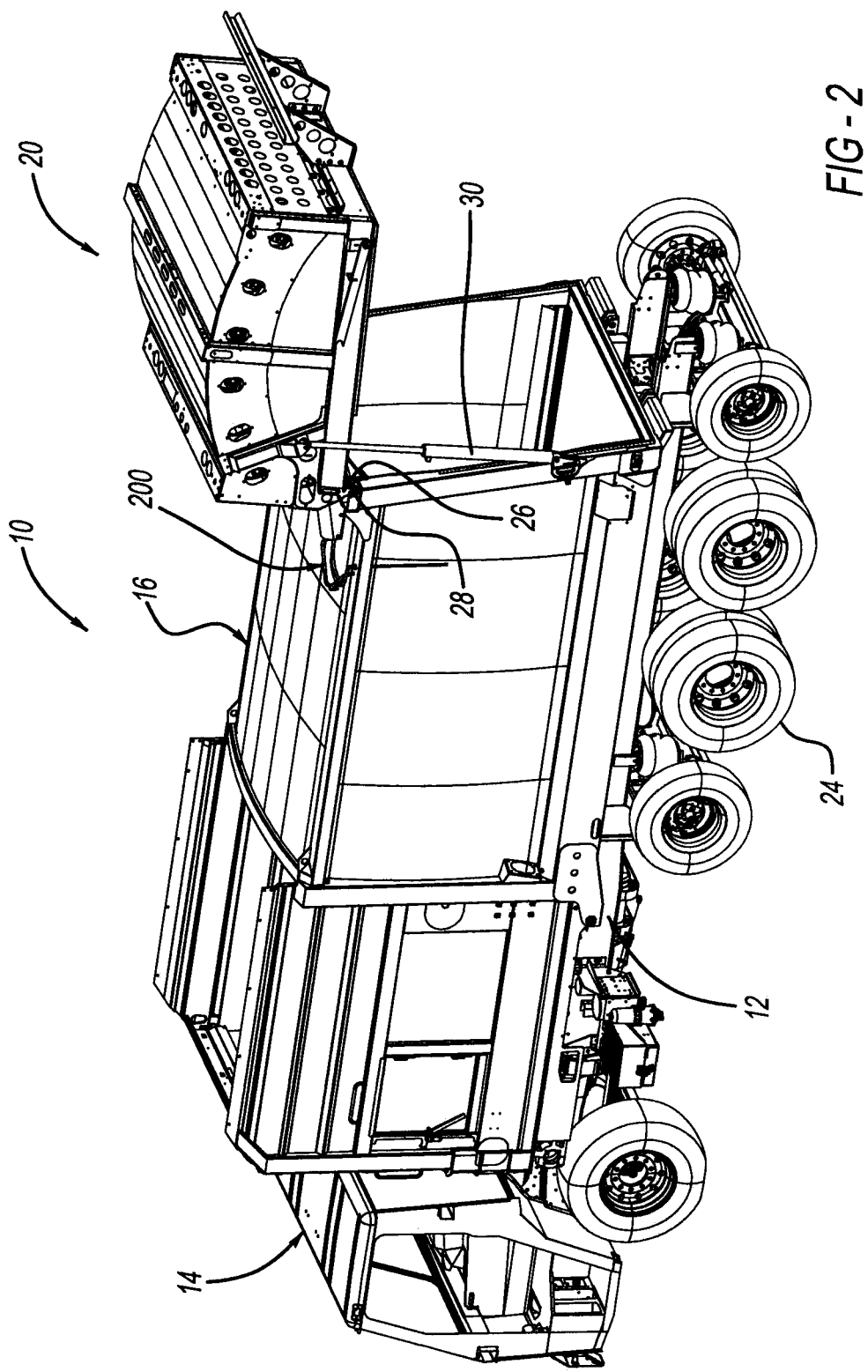
FIG. 2 is a view like FIG. 1 with the tailgate in a raised position.
Figure 3:
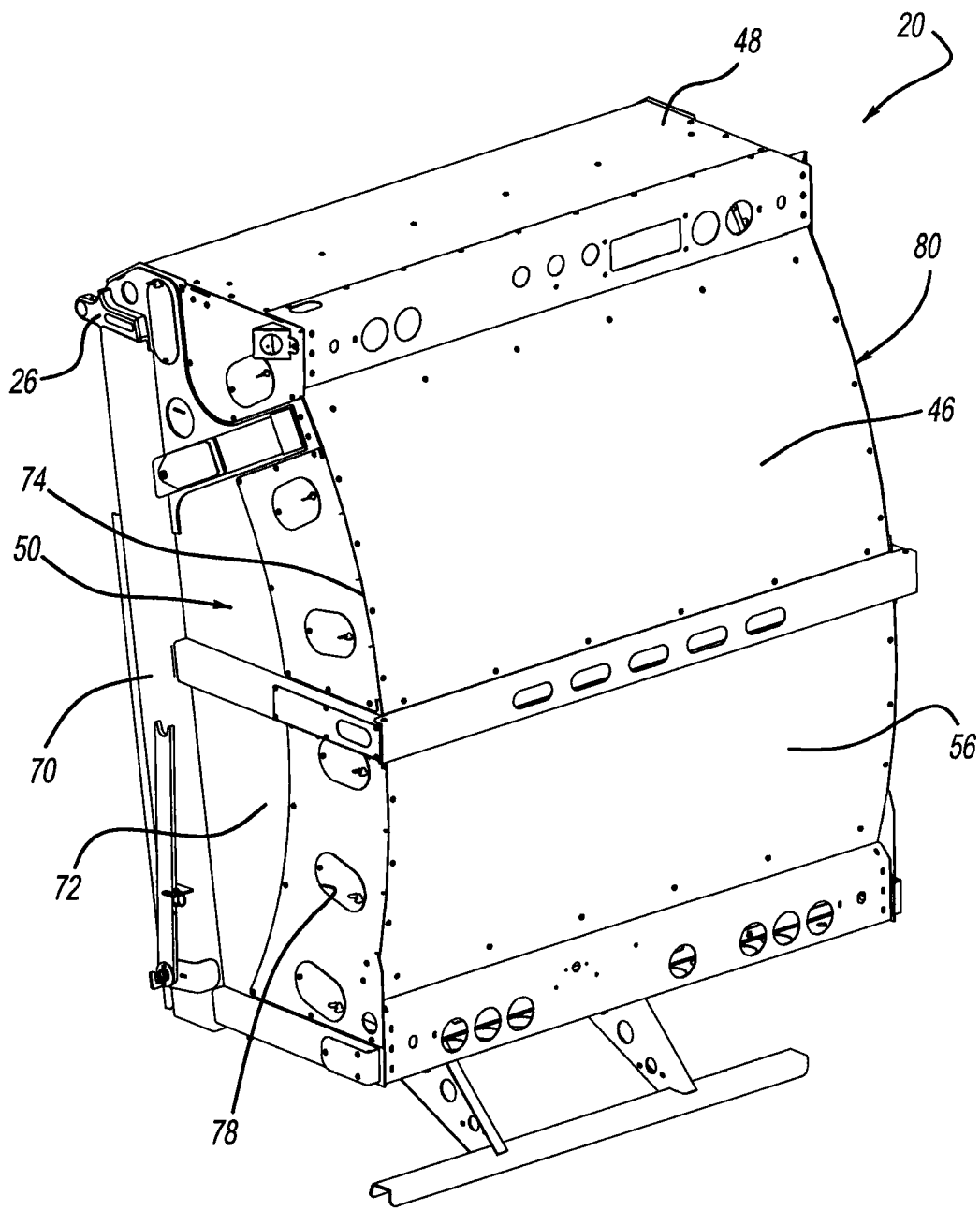
FIG. 3 is a perspective view of the tailgate of FIGS. 1 and 2.
Figure 4:
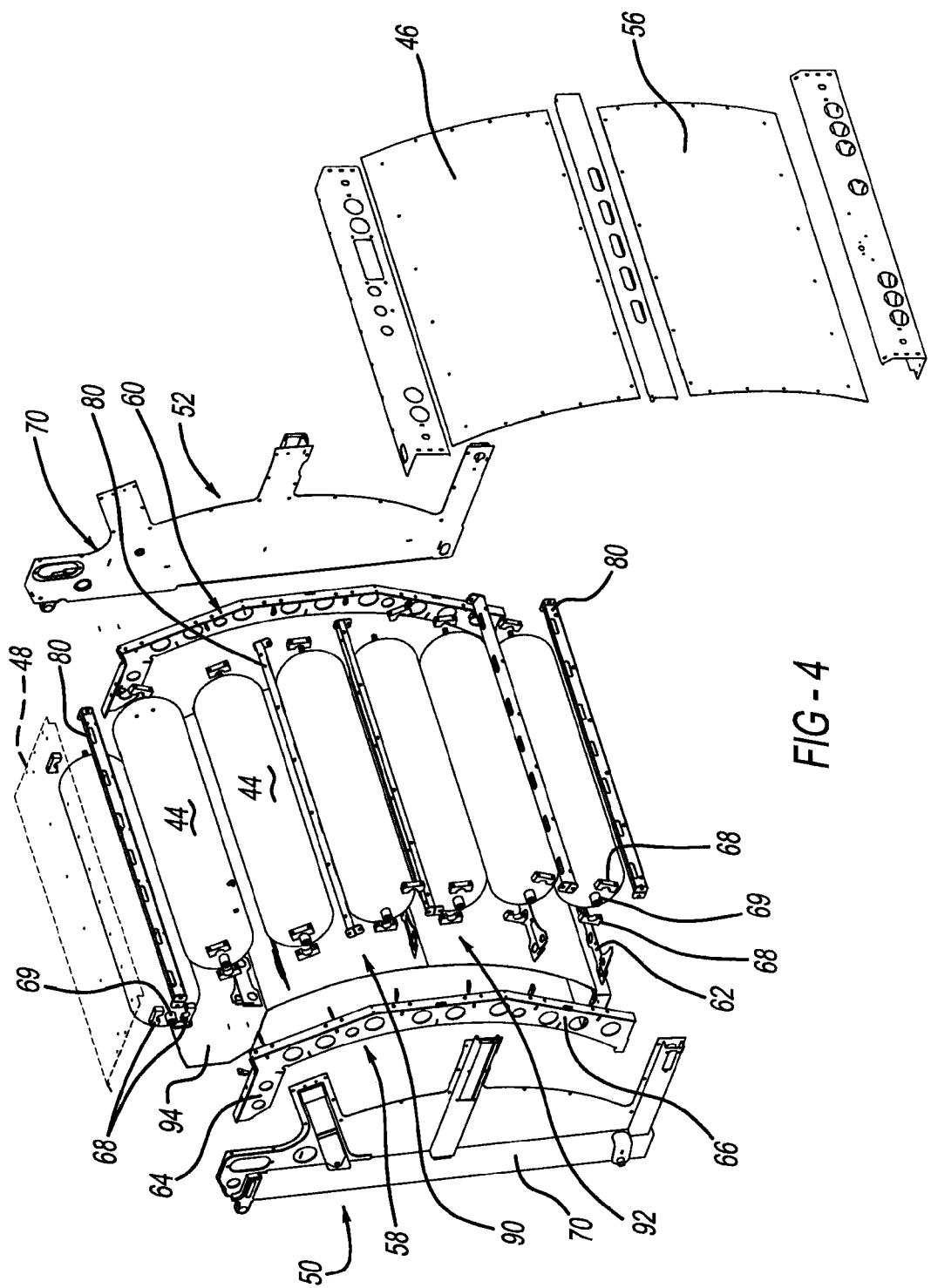
FIG. 4 is an exploded perspective view of the tailgate of FIG. 3.

The tailgate 20 is secured to the container 16 by hinges 26. The hinges 26 are connected around pivot pins 28 so that the tailgate 20 can rotate with respect to the refuse container 16. In order to rotate, a pair of lift cylinders 30 is on each side of the tailgate 20. The lift cylinders 30 are coupled with the tailgate so that for opening of the container 16, the cylinders 30 are actuated which, in turn, pivot the tailgate 20 about the pivots pins 28 via the hinges 26 as seen in FIG. 2.

The tailgate 20 includes a cover 40, framework 42 and a plurality of CNG tanks 44. The cover 40 includes a front portion 46, a top portion 48, side portions 50, 52, a back portion 54, and bottom portion 56. The cover portions 46-56 surround the framework 42 and tanks 44 to prevent access to the tanks 44.

The framework 42 includes a pair of side beams 58, 60 which are substantially identical. Thus, the explanation of one will apply to both the side beams 58, 60. A plurality of cross beams 62 connects the side beams 58, 60 together. The side beams 58, 60 have a first portion 64 and a second portion 66. The first portion 64 is angled with respect to the second portion 66. The second portion 66 has an overall arcuate design and curves longitudinally between the top and bottom of the tailgate 20. The first portion 64 is planar and is at the top of the tailgate 20. The hinges 26 are secured with the reinforcement member 70. A plurality of saddle blocks 68 receives the ends 69 of the tanks 44. The saddle blocks 68 maintain the tanks 44 on the framework 42. The saddle blocks 68 are fastened to the side beams 58, 60. Additionally, by combining the tanks 44 with the side beams 58, 60 and tailgate structure 42, this creates a desirable shape with a strong lightweight design.

The cover side portions 50, 52 include an outer reinforcement member 70. The side portions 50, 52 include a body 72 attached to the reinforcement member 70. The body 72 has an overall arcuate edge 74, which follows the side beams 58, 60, that mate with the front and bottom cover portions 46, 56. The body portion 72 includes a planar top edge 76 that couples with the top cover portion 48. The side covers 50, 52 include a plurality of apertures 78 that enable access to the tanks 44 for filling and inspection purposes. A plurality of cross members 80 are secured between the side members 50, 52. The cross members 80 enable the cover portions 46, 48, and 56 to be secured, such as bolted to the cross members 80.

The top cover portion 48 has an overall L-shape following the contour of the straight edge 76 of the cover side portions 50, 52 as well as an additional edge that is perpendicular to the top edge 76. The cover portion 46 has an overall rectangular design and can be bolted or riveted or the like to the cross members 80. The bottom cover portion 56 has an overall L-shape for following the contour of the arcuate portion of the side walls as well as the straight edge or the planar bottom portion of the sidewalls 50, 52.

Thus, the tailgate 20 includes a chamber 90 defined by the cover portions 46-56 for housing the tanks 44. The chamber 90 has an arcuate portion 92 as well as a straight top portion 94. The chamber top portion 94 enables an additional tank to be positioned at the top of the tailgate 20. This provides for an additional volume of natural gas.

Thus, the cover portions 46-56 provide an aesthetic appearance to the tailgate 20. Also, the tailgate 20 does not extend above the height of the refuse vehicle. Additionally, the tanks 44 are provided at the rear of the vehicle reducing the weight on the front axle. Also, the tailgate 20 can be raised and lowered without any obstruction to the container.

Turning to FIGS. 5-9, an additional reinforcement structure of the framework side beams 58, 60 and cross beams 62 will be discussed.

Figure 5:
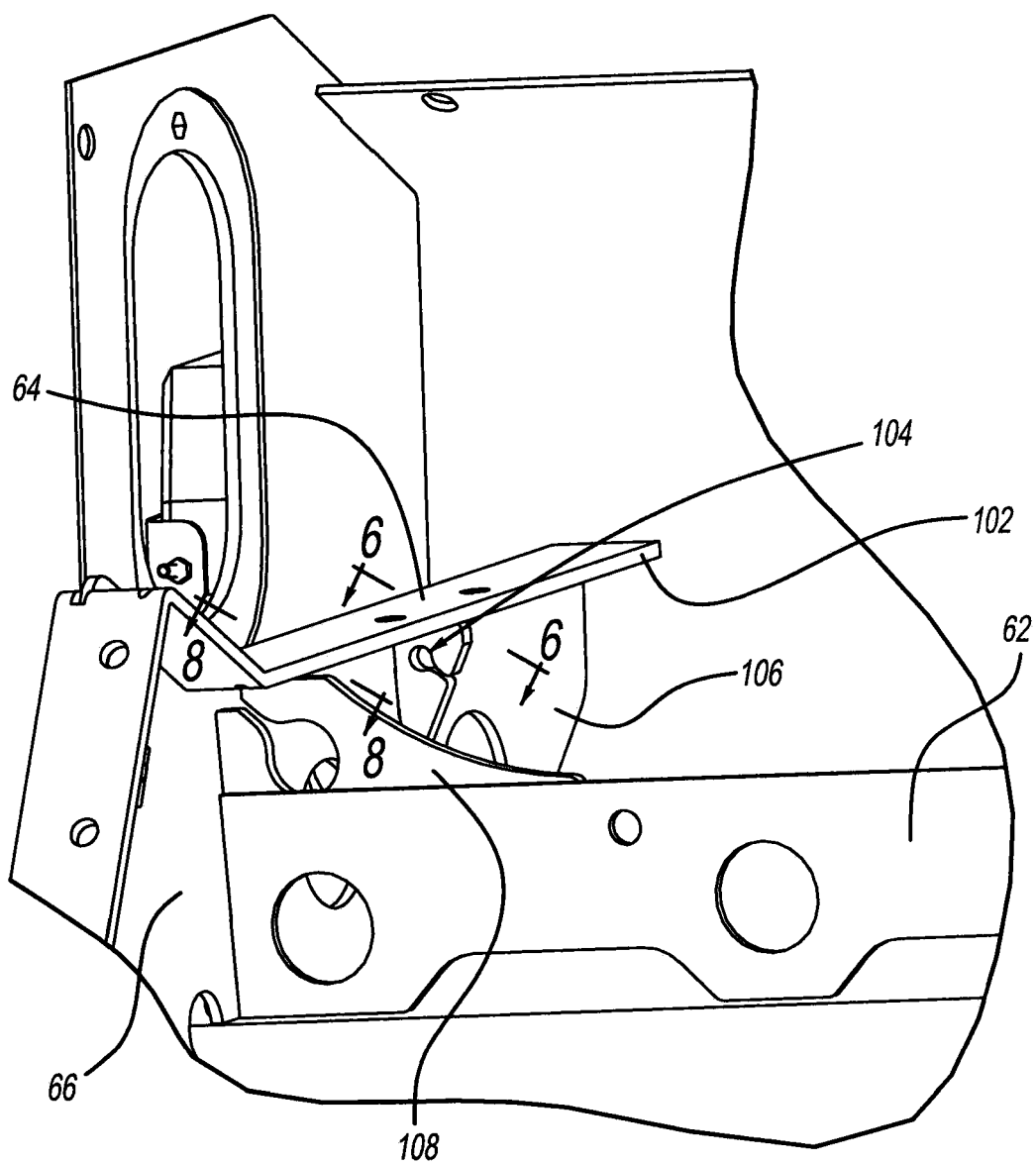
FIG. 5 is a perspective view of the support structure.
Figure 6:
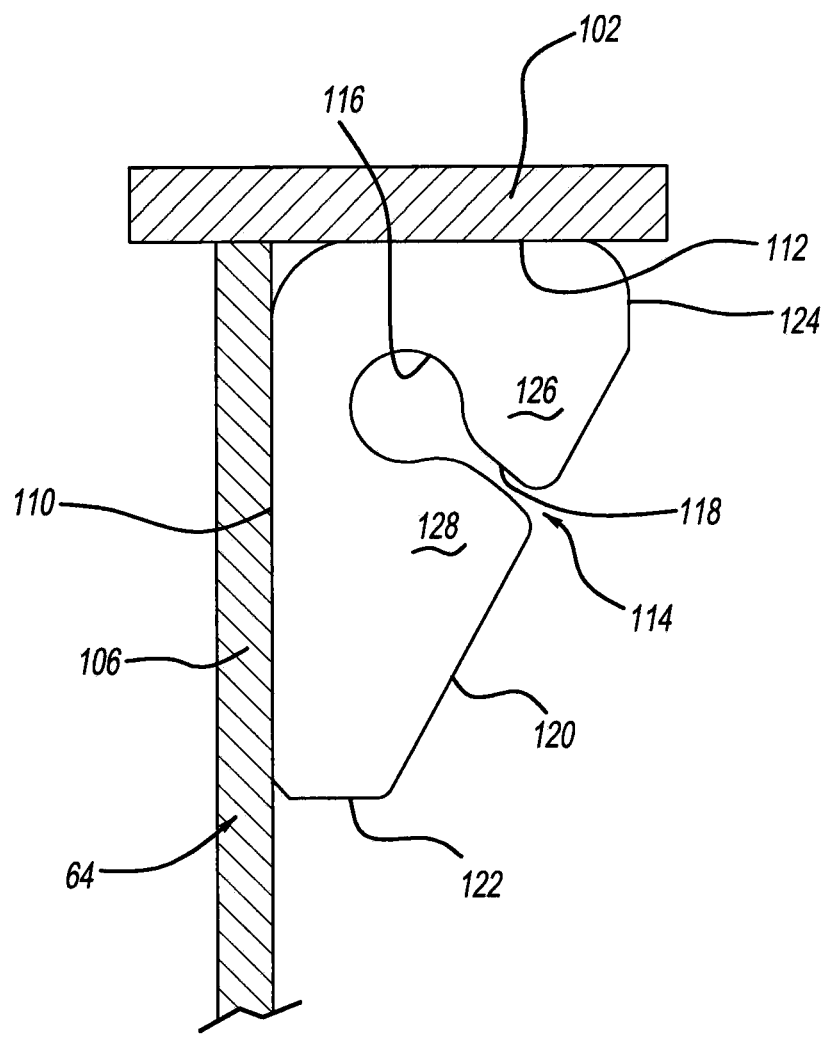
FIG. 6 is a cross-sectional view of FIG. 5 along lines 6-6.
Figure 8:
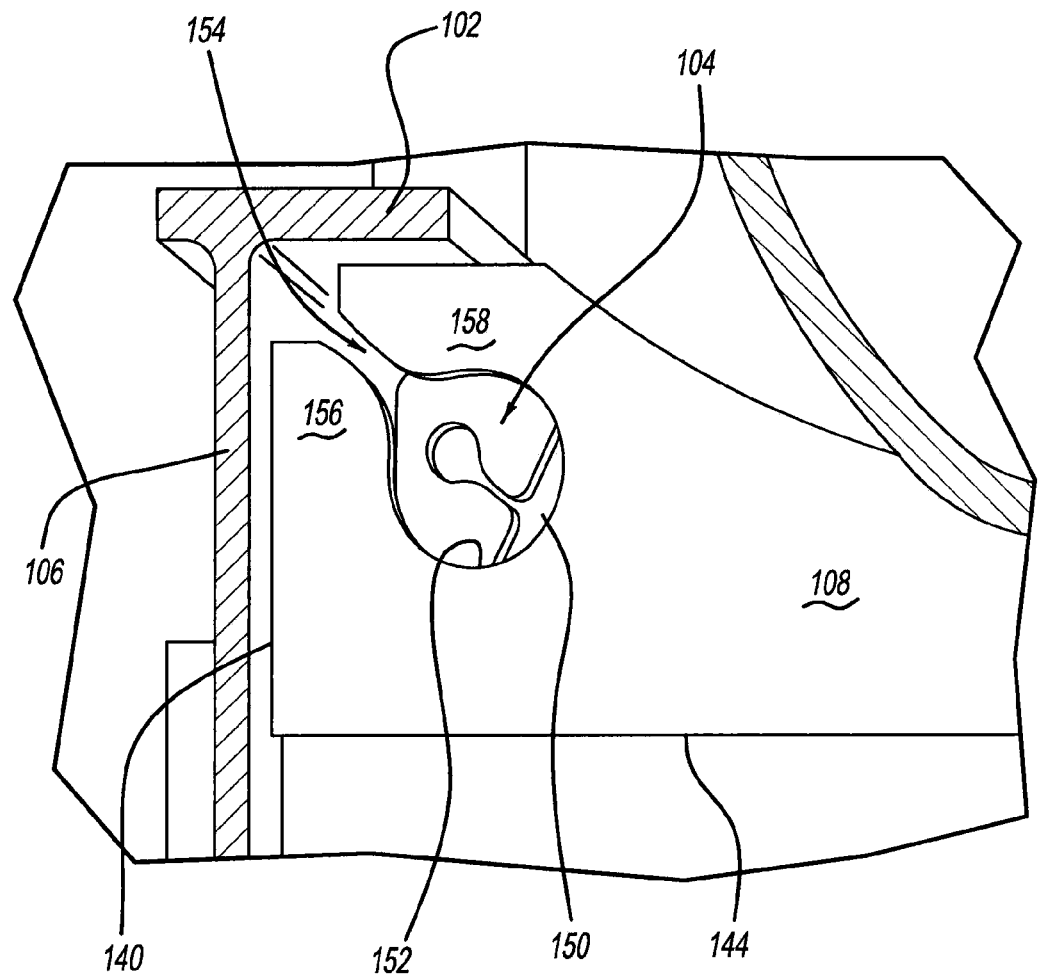
FIG. 8 is a cross-section view of FIG. 5 along line 8-8.
Figure 9:
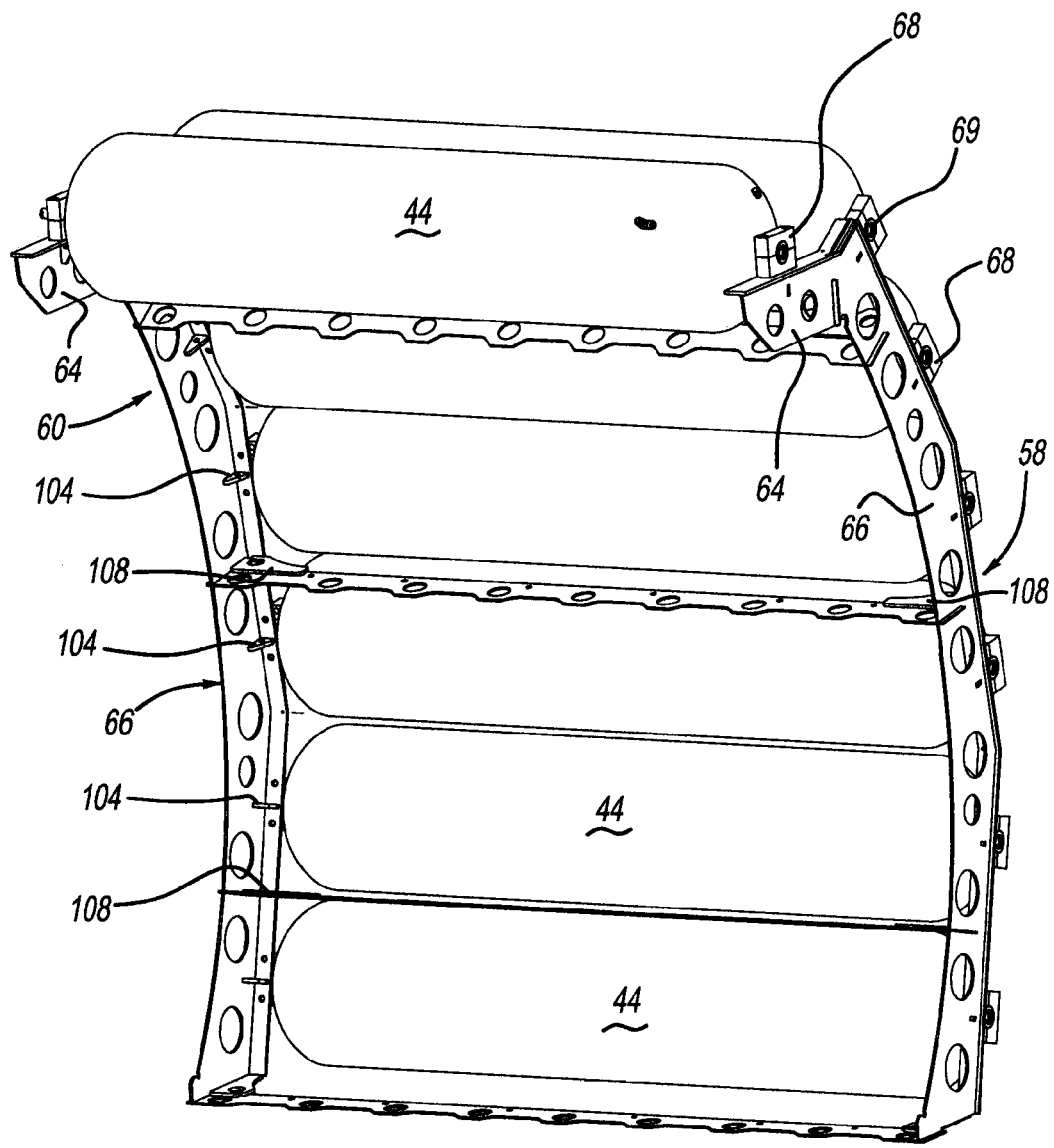
FIG. 9 is a perspective view of the frame assembly with the tanks mounted on the frame assembly.

The first portion 64 of the side beams 58, 60 includes a top flange 102 and a side wall 106. A first gusset 104 is welded to the top flange 102 and the sidewall 106 as illustrated in FIGS. 5, 6 and 9. The first gusset 104 is aligned on the side beams 58, 60 so that they are positioned under the saddle blocks 68. Additionally, a second gusset 108 is welded with the top flange 102, sidewall 106 and the cross beam 62. This is illustrated in FIGS. 5, 8 and 9.

Figure 7:
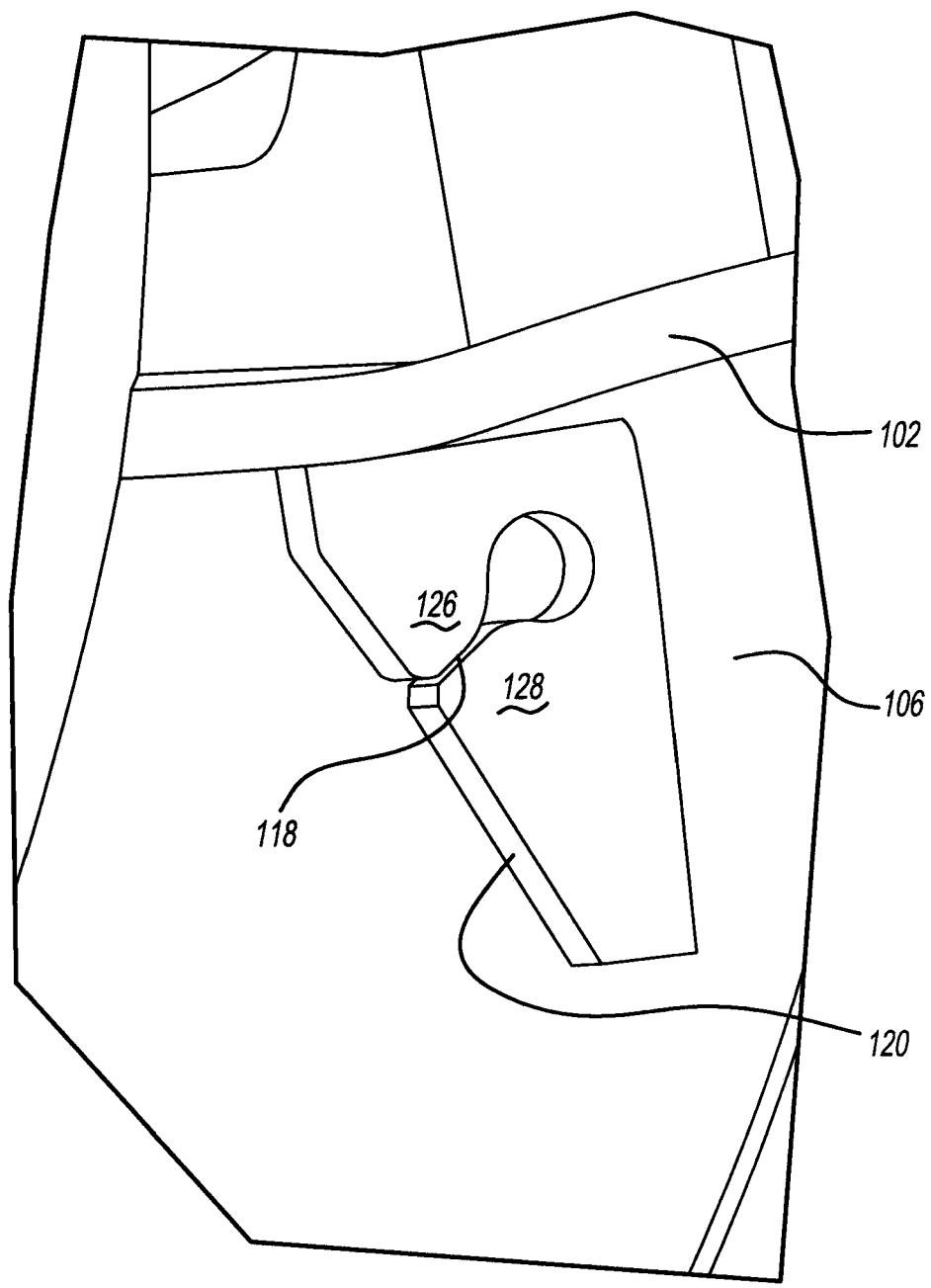
FIG. 7 is an enlarged view of FIG. 6 in a second state.

The first gusset 104 has various shapes and is illustrated as a polygonal configuration. The gusset 108 includes a first edge 110 and a second edge 112. The first and second edges 110, 112 are welded or the like to the top flange 102 and side wall 106. Thus, the gusset 104 provides additional strength to control deformation and stress in the structure. The gusset 104 includes a tear shaped aperture 114. The tear shape aperture 114 includes a circular portion 116 and a channel portion 118. As shown, the gusset 104 includes a tapered edge 120 that tapers between sides 122 and 124. The channel portion 118 of the aperture 114 extends from the circular portion 116 out to the tapered edge 120. This divides the tapered edge 120 and provides a gap creating two portions of the gusset 126, 128. As illustrated in FIG. 7, as a load is applied to the frame structure, the gusset 104 deforms to control the stress in the structure. The gusset 104 deforms such that the first and second portion 126, 128 of the gusset close the gap created by the channel portion 118 of the aperture 114. Thus, the gusset 104 controls deformation and keeps stress lower in the area even if a 20G load is applied onto the structure.

The second gusset 108 has an overall polygonal configuration. The second gusset 108 includes first and second edges 140, 142 which are secured to flange 102 and side wall 106, respectively, as described above. The first and second edges 140, 142 are welded to the top flange 102 and side wall 106. Additionally, the bottom edge 144 of the second gusset 104 is welded to the cross beam 62. The second gusset 104 includes a tear shaped aperture 150 with a circular portion 152 and a channel portion 154. The channel portion 154 extends between the junction of side edges 140, 142. This creates a gap between the first portion 156 and second portion 158 of the second gusset 108. Thus, unlike the gusset 104, the channel portion 154 opens toward the junction or corner of the flange 102 and side wall 106. When a force is applied to the second gusset 108, the gap of the channel portion 154 of the aperture 158 enlarges as the first portion 156 and second portion 158 of the second gussets 108 move apart with respect to one another. Thus, the second gusset 108 controls the deformation and stress in the structure.

Figure 10A:
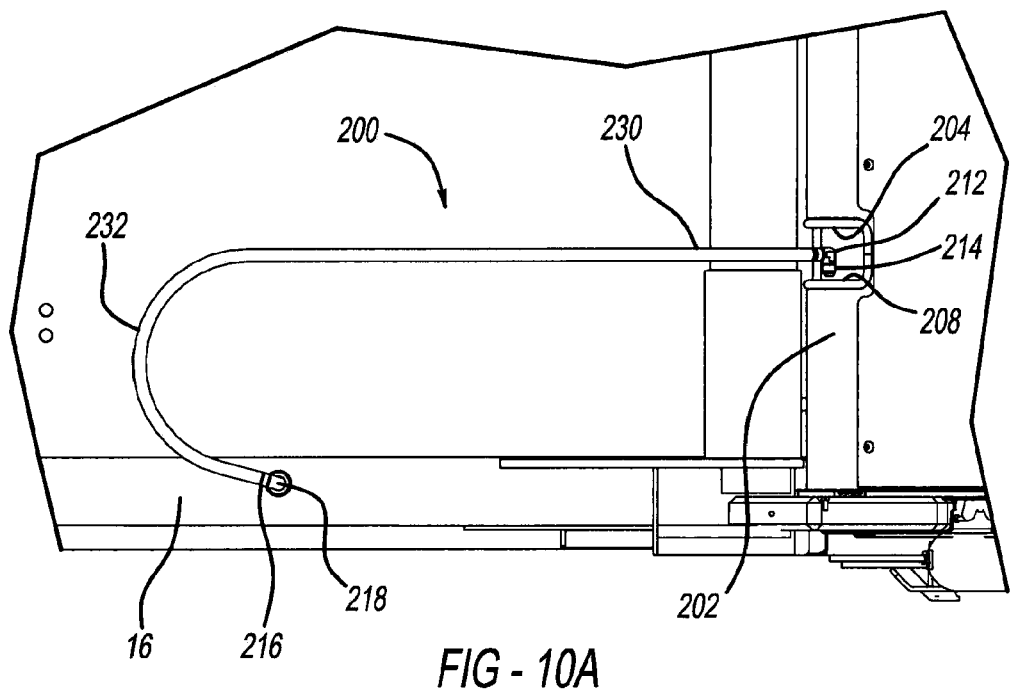
FIG. 10a is a top plan view of the CNG hi-pressure hose routing.
Figure 10B:
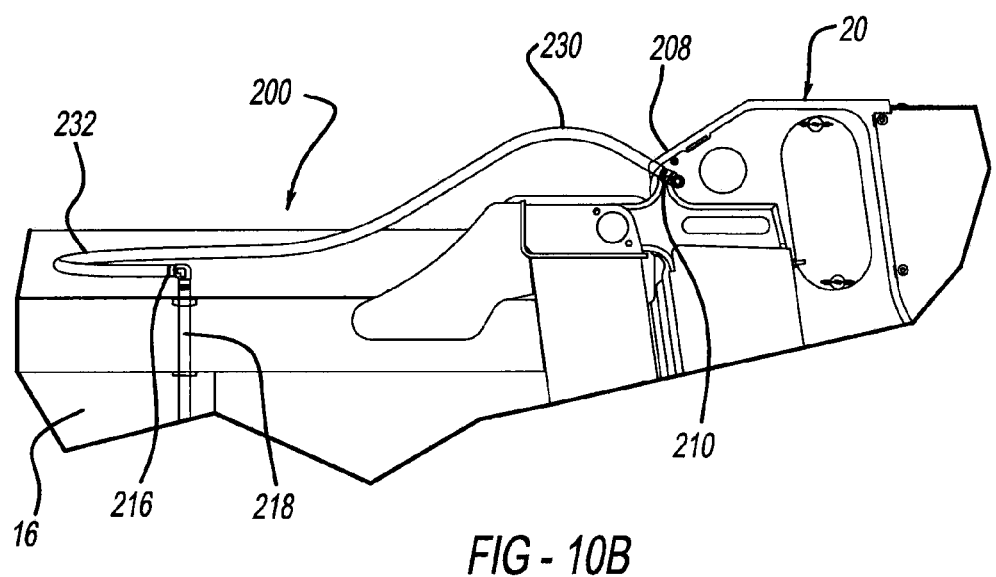
Figure 11A:
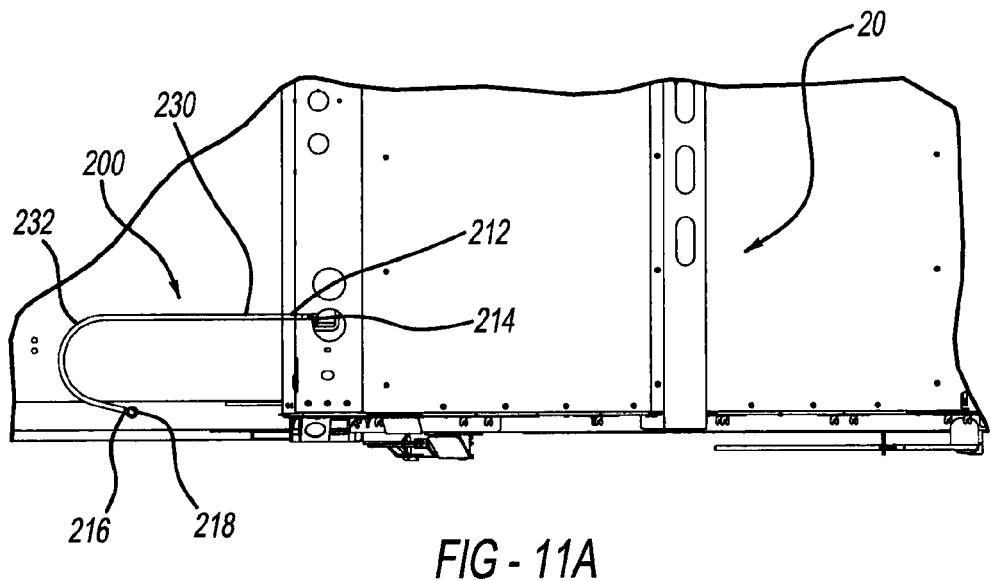
FIG. 11a is a top plan view of the hi-pressure hose routing with the tailgate in a fully raised position.
Figure 11B:
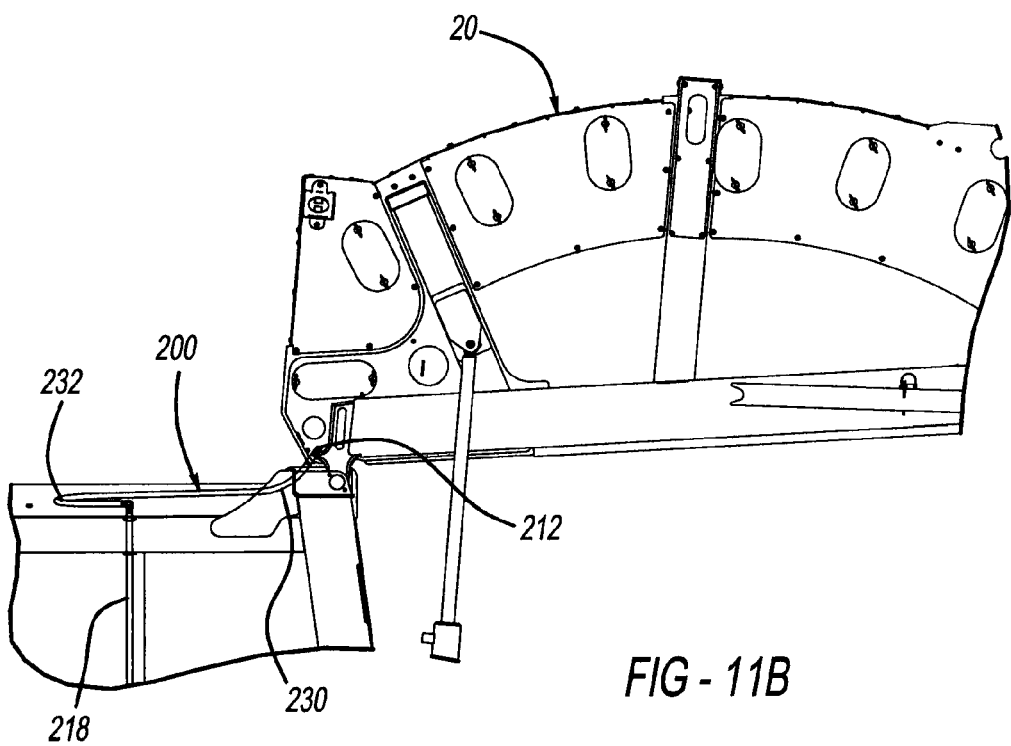

Turning to FIGS. 10 and 11, the hi-pressure CNG hose connection between the vehicle 10 and the tailgate 20 is illustrated. Here, a flexible hi-pressure CNG hose 200 is connected between the tailgate 20 and the collection bin 16. The rear portion 202 of the frame structure includes an aperture 204. The aperture 204 extends toward the cover portion 48 as well as towards the bottom of the tailgate. Thus, the aperture 204 is L-shaped with a horizontal leg 208 on the top edge and a vertical leg 210 on the side edge of the rear portion 202. One end 212 of the hi-pressure CNG hose 200 connects with a fitting 214 extending through the aperture 206. The other end 216 of the hi-pressure CNG hose 200 connects with a tube 218 that extends from the collection bin 16. When the tailgate 20 moves between an opened and a closed position, the hi-pressure CNG hose connection is not affected due to the movement of the flexible hi-pressure CNG hose 200. As the tailgate 20 moves, the flexible hi-pressure CNG hose 200 moves in two planes (horizontal and vertical). In the tailgate closed position (FIGS. 10a and 10b), the hi-pressure CNG hose 200 is positioned with one end 230 adjacent the tailgate vertically above the bin 16. The U-shaped portion 232 is positioned on top of the container bin 16. When the tailgate is in a fully opened position (FIG. 11*a*, 11*b*), the hi-pressure CNG hose end 230 adjacent the tailgate, rotates to move horizontally above the collection bin 16. The U-shaped portion 232 moves vertically upward away from the collection bin 16. This prevents the hi-pressure CNG hose 200 from exceeding a minimum bend radius or a twisting effect that would loosen the CNG fittings. Thus, the flexible hi-pressure CNG hose 200 provides movement for opening and closing movement of the tailgate 20. The flexible hi-pressure CNG hose 200 enables continuous connection between the CNG fuel system of the vehicle and the tailgate. Thus, the flexibility of the hi-pressure CNG hose 200 enables opening and closing of the tailgate without disconnection or termination of the CNG fuel system from the tailgate to the vehicle. Also, a shield 234 covers the hi-pressure CNG hose.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tailgate for a refuse vehicle comprising:
   a frame having an arcuate portion, the frame extending between a top terminal end of the tailgate and a bottom terminal end of the tailgate;
   a plurality of compressed natural gas tanks coupled with the frame, the plurality of compressed natural gas tanks are positioned onto the frame from the top of the frame to the bottom of the frame such that the plurality of compressed natural gas tanks are aligned one after the other in a single file pattern so that the single file pattern of the plurality of compressed natural gas tanks define an arcuate line along the frame from the top of the tailgate to the bottom of the tailgate and the plurality of tanks extend from the top of the tailgate to the bottom of the tailgate; and
   a cover covering the frame.

2. The tailgate for a refuse vehicle of claim 1, wherein the frame has a first portion and a second portion, the second portion is overall arcuate.

3. The tailgate for a refuse vehicle of claim 1, wherein at least one of the plurality of compressed natural gas tanks is positioned between a pair of hinges for connecting to the refuse vehicle.

4. The tailgate for a refuse vehicle of claim 2, wherein at least one of the plurality of compressed natural gas tanks is positioned in the first portion.

5. A refuse vehicle comprising:
   a vehicle chassis;
   a container secured with the vehicle chassis;
   a tailgate coupled with the container, the tailgate further comprising:
   a frame having an arcuate portion, the frame extending between a top terminal end of the tailgate and a bottom terminal end of the tailgate;
   a plurality of compressed natural gas tanks coupled with the frame, the plurality of compressed natural gas tanks are positioned onto the frame such that the plurality of compressed natural gas tanks are aligned one after the other in a single file pattern so that the single file pattern of the plurality of compressed natural gas tanks define an arcuate line along the frame from the top of the tailgate to the bottom the tailgate; and
   a cover covering the frame.

6. The refuse vehicle of claim 5, wherein the second portion has an overall arcuate portion.

7. The refuse vehicle of claim 5, wherein at least one of the plurality of compressed natural gas tanks is positioned between a pair of hinges for connecting to the refuse vehicle.

8. The refuse vehicle of claim 5, wherein at least one of the plurality of compressed natural gas tanks is positioned in the first portion.

9. The tailgate of claim 1, further including a plurality of gussets configured to strengthen the frame.

10. The refuse vehicle of claim 5, further including a vehicle fuel system and a flexible compressed natural gas hi-pressure hose coupling the compressed natural gas tanks with the vehicle fuel system.

11. A tailgate for a refuse vehicle comprising:
    a frame, the frame has a pair of arched beams extending between a top terminal end and a bottom terminal end of the tailgate, the frame arched beams include a plurality of members for receiving compressed natural gas tanks along the arched beam from the top of the tailgate to the bottom of the tailgate with the compressed natural gas tanks positioned between the pair of arched beams, the plurality of members for receiving the compressed natural gas tanks are positioned on the beams such that the plurality of members are aligned one after the other in a single file pattern so that the single file pattern of the plurality of members for receiving the compressed natural gas tanks define an arcuate line along the frame arched beams from the top of the tailgate to the bottom of the tailgate; and
    a cover covering the frame.

12. The tailgate for a refuse vehicle of claim 11, wherein at least one compressed natural gas tank is positioned between a pair of hinges for connecting to the refuse vehicle.

13. The tailgate for a refuse vehicle of claim 11, wherein a plurality of compressed natural gas tanks is positioned on the frame.

14. A refuse vehicle comprising:
    a vehicle chassis;
    a container secured with the vehicle chassis;
    a tailgate coupled with the container, the tailgate further comprising:
    a frame including a pair of sides, each side including a hinge member coupling the tailgate with the container;
    each side has an arched portion extending from a top terminal end of the tailgate to a bottom terminal end of the tailgate, each side includes a plurality of members for receiving compressed natural gas tanks; and
    a plurality of compressed natural gas tanks is positioned between the pair of sides, and the plurality of compressed natural gas tanks is coupled with the plurality of receiving members on the pair of sides, the compressed natural gas tanks positioned along the frame;
    a pair of end cross members, one end cross member positioned at an end of the frame at the top of the tailgate and the other end cross member positioned at an end of the frame at the bottom of the tailgate, and at least one third cross member positioned between the tailgate top and bottom end cross members and adjacent the compressed natural gas tanks; and
    a cover covering the frame.

15. The refuse vehicle of claim 14, wherein at least one of the plurality of compressed natural gas tanks is positioned between a pair of hinges for connecting to the refuse vehicle.

16. The tailgate of claim 11, further including a plurality of gussets configured to strengthen the frame.

17. The refuse vehicle of claim 14, further including a vehicle fuel system and a flexible compressed natural gas hi-pressure hose coupling the compressed natural gas tanks with the vehicle fuel system.

\* \* \* \* \*